US008856486B2

(12) United States Patent  (10) Patent No.: US 8,856,486 B2
Sharp et al.  (45) Date of Patent: Oct. 7, 2014

(54) DEPLOYING A COPY OF A DISK IMAGE FROM SOURCE STORAGE TO TARGET STORAGE

(75) Inventors: Richard William Sharp, Cambridge (GB); David Jonathan Scott, Cambridge (GB); Jonathan James Ludlam, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 546 days.

(21) Appl. No.: 13/285,699

(22) Filed: Oct. 31, 2011

(65) Prior Publication Data

US 2012/0215998 A1  Aug. 23, 2012

Related U.S. Application Data

(60) Provisional application No. 61/445,865, filed on Feb. 23, 2011.

(51) Int. Cl.
  *G06F 3/06* (2006.01)
  *G06F 9/445* (2006.01)
  *G06F 9/455* (2006.01)

(52) U.S. Cl.
  CPC ...... *G06F 3/061* (2013.01); *G06F 8/63* (2013.01); *G06F 9/45558* (2013.01); *G06F 3/0614* (2013.01); *G06F 3/065* (2013.01); *G06F 3/067* (2013.01)
  USPC ........................................................ 711/173

(58) Field of Classification Search
  None
  See application file for complete search history.

(56) References Cited

U.S. PATENT DOCUMENTS

| | | | |
|---|---|---|---|
| 2004/0210591 A1* | 10/2004 | Hirschfeld et al. | 707/100 |
| 2006/0155931 A1* | 7/2006 | Birrell et al. | 711/115 |
| 2007/0094348 A1* | 4/2007 | Scheidel et al. | 709/217 |
| 2008/0144471 A1* | 6/2008 | Garapati et al. | 369/99 |
| 2008/0235266 A1 | 9/2008 | Huang et al. | |
| 2008/0235445 A1* | 9/2008 | Kacin et al. | 711/112 |
| 2009/0216975 A1* | 8/2009 | Halperin et al. | 711/162 |
| 2009/0292737 A1* | 11/2009 | Hayton | 707/200 |
| 2010/0299368 A1* | 11/2010 | Hutchins et al. | 707/803 |
| 2011/0022574 A1 | 1/2011 | Hansen | |
| 2012/0054742 A1* | 3/2012 | Eremenko et al. | 718/1 |
| 2012/0054743 A1* | 3/2012 | Fujiwara | 718/1 |
| 2012/0192175 A1* | 7/2012 | Dorai et al. | 718/1 |

OTHER PUBLICATIONS

Joe Meehean and Greg Quinn. "Logical Image Migration Based on Overlays." May 2005. http://pages.cs.wisc.edu/~jmeehean/ClassProjects/Limbo.pdf.*

(Continued)

*Primary Examiner* — Nathan Sadler
(74) *Attorney, Agent, or Firm* — BainwoodHuang

(57) ABSTRACT

A technique deploys a copy of a disk image from source storage to target storage. The technique involves identifying a particular disk image to be copied from the source storage to the target storage. The technique further involves performing a comparison operation between a first disk image list which lists disk images on the source storage and a second disk image list which lists disk images on the target storage to generate a common disk image list which lists a set of common disk images on both the source and target storage. The technique further involves transferring, from the source storage to the target storage, a set of data portions representing differences between the particular disk image and a common disk image listed on the common disk image list. The set of data portions in combination with the common disk image form a deployed copy on the target storage.

20 Claims, 6 Drawing Sheets

(56) References Cited

OTHER PUBLICATIONS

Lei Shi et al. "Iceberg: An Image Streamer for Space and Time Efficient Provisioning of Virtual Machines." Sep. 2008. IEEE. ICPP-W '08. pp. 31-38.*

Kathryn Watkins et al. "Teleporter: an analytically and forensically sound duplicate transfer system." Aug. 2009. Elsevier. Digital Investigation 6. pp. S43-S47.*

Yang Chen et al. "An Efficient Resource Management System for On-line Virtual Cluster Provision." Sep. 2009. IEEE. Cloud '09. pp. 72-79.*

Glenn Ammons et al. "Virtual machine images as structured data: the Mirage image library." Jun. 2011. USENIX. HotCloud '11.*

* cited by examiner

DEPLOYING A COPY OF A DISK IMAGE FROM SOURCE STORAGE TO TARGET STORAGE

CROSS REFERENCE TO RELATED APPLICATIONS

This application claims the benefit under 35 U.S.C. §119 (e) of U.S. Provisional Application Ser. No. 61/445,865 entitled "METHODS AND SYSTEMS FOR EFFICIENT COPYING OF DISK IMAGES BETWEEN VIRTUALIZATION DEPLOYMENTS," filed on Feb. 23, 2011, the contents and teachings of which are hereby incorporated by reference in their entirety.

BACKGROUND

A virtual disk image is an electronic file which a virtual machine monitor (VMM) interprets as a physical disk. Common formats for virtual disk images include .VMDK, .VHD, and .VDI.

An administrator of virtual machine (VM) platforms may wish to copy a virtual disk image from one place (or physical location) to another. For example, the administrator may wish to maintain copies of the same virtual disk image at different sites for disaster recovery purposes. As another example, the administrator may wish to backup a virtual disk image, i.e., take a VM snapshot of a virtual disk image. As yet another example, the administrator may wish to duplicate VMs on multiple VM farms from a non-writeable virtual disk image called a "golden image".

To copy a virtual disk image from a first device to a second device, the administrator initially makes sure that the second device has enough physical storage space to hold the virtual disk image, and that a reliable network path exists between the first device and the second device. Next, the administrator moves a complete copy of the virtual disk image from the first device to the second device through the network path until the complete copy of the virtual disk image has been written safely to the physical storage space of the second device.

SUMMARY

Unfortunately, there are deficiencies to the above-described conventional approach to moving a complete copy of a virtual disk image from a first device to a second device through a network path. For example, in the above-described conventional approach, it may take several hours to move a complete copy of a large virtual disk image between two devices. Additionally, moving a complete copy of a virtual disk image over a network may consume considerable network bandwidth.

In contrast to the above-described conventional approach to moving a complete copy of a virtual disk image between two devices, an improved technique involves deploying a copy of a particular disk image from one computing device to another by identifying disk images which are common among the two devices, and then transferring only differences (or deltas) between the particular disk image and a common disk image (rather than a complete copy of the particular disk image) to the other computing device. The common disk image and the differences form an entire copy of the particular disk image. To identify disk images which are common among the two devices, the disk images are tracked using disk image identifiers which uniquely identify disk images. This technique of identifying disk images which are in common, and moving only the differences saves time and resources.

One embodiment is directed to a method of deploying a copy of a disk image from source storage to target storage. The method includes identifying a particular disk image to be copied from the source storage to the target storage. The method further includes performing a comparison operation between a first disk image list which lists disk images currently residing on the source storage and a second disk image list which lists disk images currently residing on the target storage to generate a common disk image list which lists a set of common disk images currently residing on both the source storage and the target storage. The method further includes transferring, from the source storage to the target storage, a set of data portions representing differences between the particular disk image and a common disk image listed on the common disk image list. The set of data portions transferred from the source storage to the target storage in combination with the common disk image listed on the common disk image list form a deployed copy of the particular disk image on the target storage.

In some arrangements, identifying the particular disk image to be copied from the source storage to the target storage includes specifying a particular disk image identifier which uniquely identifies the particular disk image among the disk images currently residing on the source storage (e.g., a globally unique identifier or GUID). Such an identifier may be generated electronically in response to initial formation of the particular disk image. Moreover, such an identifier may include a hash of at least a portion of the particular disk image to provide global uniqueness to the identifier within the operating environment.

In some arrangements, the first disk image list includes a first set of disk image identifiers identifying the disk images currently residing on the source storage. Additionally, the second disk image list includes a second set of disk image identifiers identifying the disk images currently residing on the target storage. In these arrangements, performing the comparison operation includes (i) comparing the first set of disk image identifiers to the second set of disk image identifiers to generate a common set of disk image identifiers, each disk image identifier of the common set belonging to both the first set of disk image identifiers and the second set of disk image identifiers, and (ii) outputting the common set of disk image identifiers as at least part of the common disk image list.

In some arrangements, each disk image identifier of the common set of disk image identifiers identifies a virtual disk image having a respective amount of commonality with the particular disk image. In these arrangements, the method further includes (i) evaluating, for each virtual disk image identified by the common set of disk image identifiers, the respective amount of commonality of that virtual disk image with the particular disk image, and (ii) selecting, from virtual disk images identified by the common set of disk image identifiers, the virtual disk image with the highest amount of commonality with the particular disk image as the common disk image.

In some arrangements, the method further includes comparing the highest amount of commonality to a predefined threshold to determine whether the amount of commonality is insignificant to warrant entirely copying the particular disk image from the source storage to the target storage. In these arrangements, transferring the set of data portions representing the differences occurs only when the highest amount of commonality is greater than or equal to the predefined threshold (e.g., 5%, 10%, and so on). Otherwise, the entire particular disk image is transferred from the source storage to the target storage in these arrangements.

Other embodiments are directed to computing devices, computing platforms, systems, computer program products, and so on. Some embodiments are directed to various processes, electronic components and circuits which are involved in deploying a copy of a disk image from source storage to target storage.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques for deploying a copy of a particular disk image between two devices involve identifying disk images which are in common, and transferring the differences (or deltas) between the particular disk image and a common disk image from one device to the other rather than the complete disk image. To identify disk images which are common between the two devices, the disk images are tracked using disk image identifiers which uniquely identify disk images. As a result, the devices are able to identify disk images which are in common and, therefore, can move only the differences to save time and resources.

Figure 1:
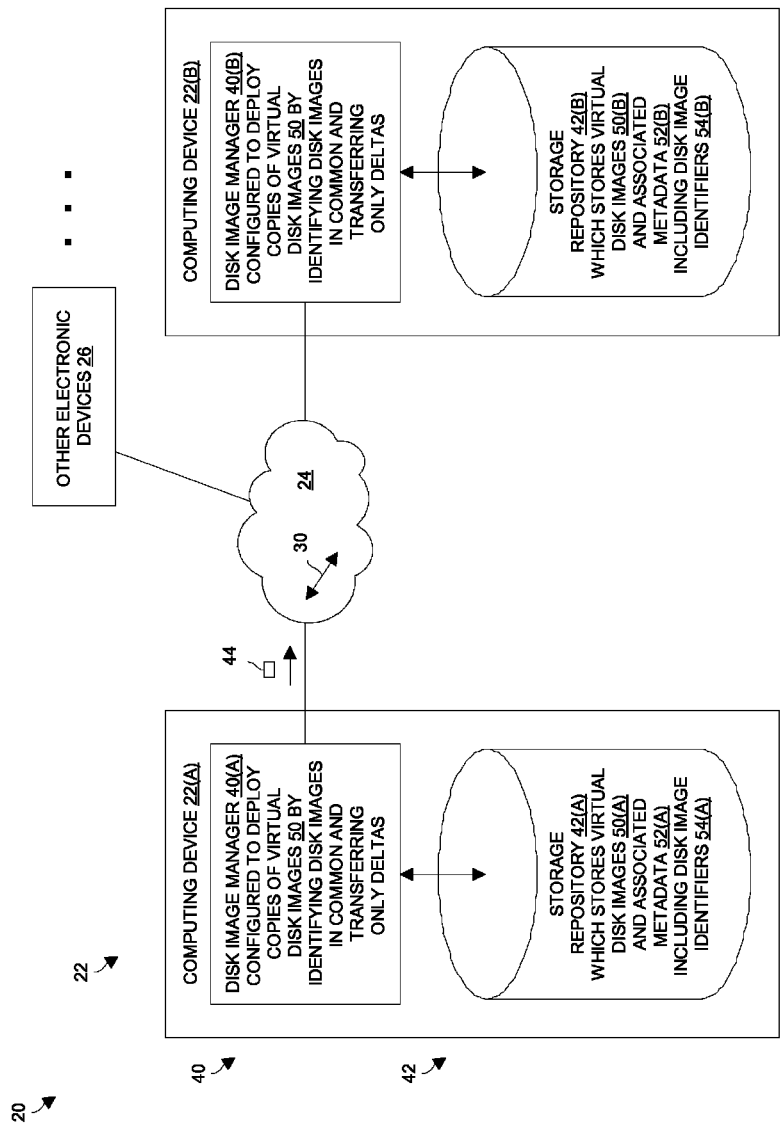
FIG. 1 is a block diagram of an electronic environment which is suitable for use in deploying a copy of a disk image between computing devices.

FIG. 1 shows an electronic environment 20 which is capable of deploying a copy of a virtual disk image using the improved techniques. The electronic environment 20 includes computing devices 22(A), 22(B) (collectively, computing devices 22), and a communications medium 24. The electronic environment 20 may further include additional computing devices 22, as well as one or more other electronic devices 26.

The communications medium 24 connects to the computing devices 22 and to the other electronic devices 26 to enable these components of the environment 20 to exchange electronic communications 30 with each other (e.g., illustrated by the two-sided arrow 30 in FIG. 1). Along these lines, the communications medium 24 is illustrated as a cloud because it is capable of having a variety of topologies including hub-and-spoke, backbone, loop, irregular, a combination of the Internet and LAN(s), combinations thereof, and so on.

Each computing device 22 includes a disk image manager 40 and a storage repository 42. For example, the computing device 22(A) includes a disk image manager 40(A) and a storage repository 42(A). Similarly, the computing device 22(B) includes a disk image manager 40(B) and a storage repository 42(B).

The disk image manager 40 of each computing device 22 is constructed and arranged to coordinate operation with the disk image managers 40 of other computing devices 22 within the electronic environment 20 to deploy copies of virtual disk images 50 by identifying disk images in common and transferring disk image differences 44 between the computing devices 22. Such a transfer of disk image differences 44, rather than complete copies of the virtual disk images 50, makes more efficient use of network resources (e.g., bandwidth) and takes less time.

The storage repository 40 of each computing device 22 is constructed and arranged to reliably store the virtual disk images 50 as well as metadata 52 associated with the virtual disk images 50 on behalf of that computing device 22. For example, the storage repository 40(A) of the computing device 22(A) is constructed and arranged to store the virtual disk images 50(A) as well as metadata 52(A) associated with the virtual disk images 50(A). Likewise, the storage repository 40(B) of the computing device 22(B) is constructed and arranged to store the virtual disk images 50(B) as well as metadata 52(B) associated with the virtual disk images 50(B).

As will be explained in further detail shortly, the metadata 52 associated with each disk image 50 is (i) managed by the disk image manager 40, and (ii) includes particular information about that disk image 50. For example, the metadata 52 includes a globally unique identifier (or GUID) which uniquely identifies the associated disk image 50 among other disk images 50 of the electronic environment 20. The metadata 52 may include other information such as whether the associated disk image 50 is consider to be a golden image, whether the associated disk image 50 is related to a parent disk image 50 (i.e., whether the associated disk image 50 is a modified version of an earlier disk image 50), whether the associated disk image 50 is related to a child disk image 50 (i.e., whether the associated disk image 50 has been modified to form a new disk image 50), and so on. Further details will now be provided with reference to FIG. 2.

Figure 2:
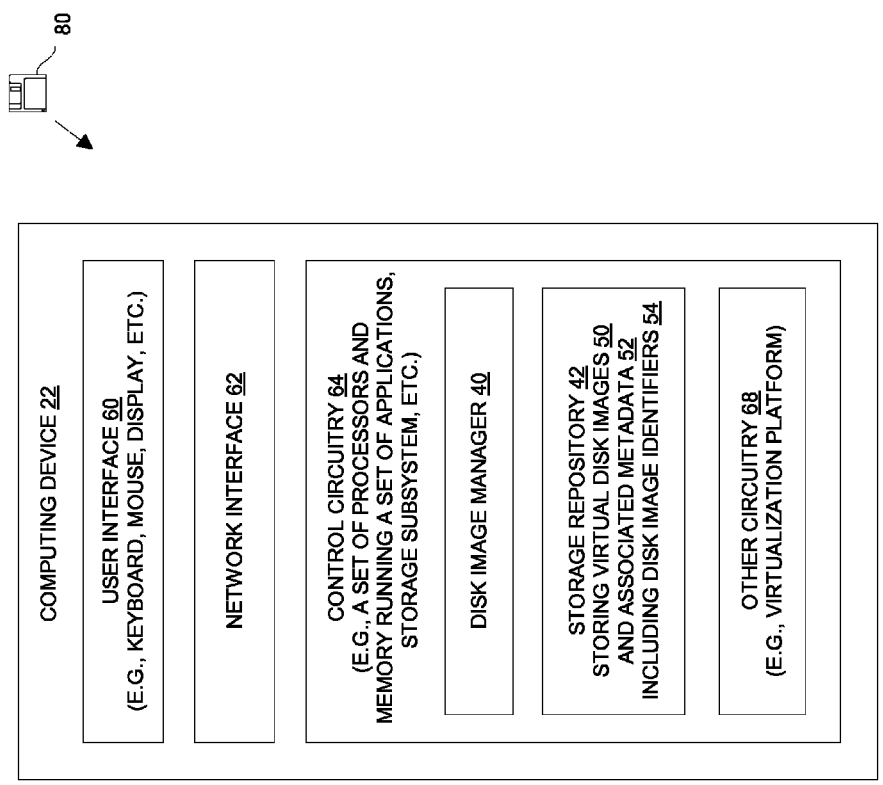
FIG. 2 is a block diagram of a computing device of the electronic environment of FIG. 1.

FIG. 2 shows particular details of a computing device 22 of the electronic environment 20. The computing device 22 includes a user interface 60, a network interface 62, and control circuitry 64. The user interface 60 (e.g., a keyboard, mouse and display) is constructed and arranged to receive input from a user, and to provide output to the user. The network interface 62 (e.g., a network adapter, a network card, etc.) is constructed and arranged to connect to the communications medium 24 and thus enable the computerized device 22 to exchange electronic communications 30 with other devices 22, 26 through the communications medium 24 (also see FIG. 1). The control circuitry 64 (e.g., a set of processors and memory running a set of applications, a storage subsystem, and so on) is constructed and arranged to form a disk image manager 40, and a storage repository 42 to manage and maintain disk images 50 and associated metadata 52 including globally unique disk image identifiers 54, and other circuitry 68 (e.g., for a virtualization platform).

In the context of a set of processors and memory running a set of applications, it should be understood that the control circuitry 64 is capable of performing a variety of other useful computerized operations or tasks as well as form a variety of specialized circuits. Along these lines, in some arrangements, the disk image manager 40 and the storage repository 42 are formed by actual hardware. In these arrangements, the disk image manager 40 is created by running a specialized program on a physical processor. Additionally, the storage repository 42 is formed by a database residing directly within a physical storage subsystem.

In other virtualized arrangements, the control circuitry 64 includes a hypervisor and a set of virtual machines running on the hardware to form a virtualization platform (e.g., see other circuitry 68 in FIG. 2). In these virtualized arrangements, the disk image manager 40 is capable of running within a virtual machine of the virtualization platform, and the storage repository 42 is capable of residing in a virtual disk of the virtual machine.

It should be understood that a computer program product 80 is capable of delivering a set of instructions to the computing device 22 that, when run on a processor, causes the processor to operate as the disk image manager 40. In these arrangements, the computer program product 80 includes a non-transitory computer readable medium which stores code that controls operation of the processor. Examples of suitable non-transitory computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
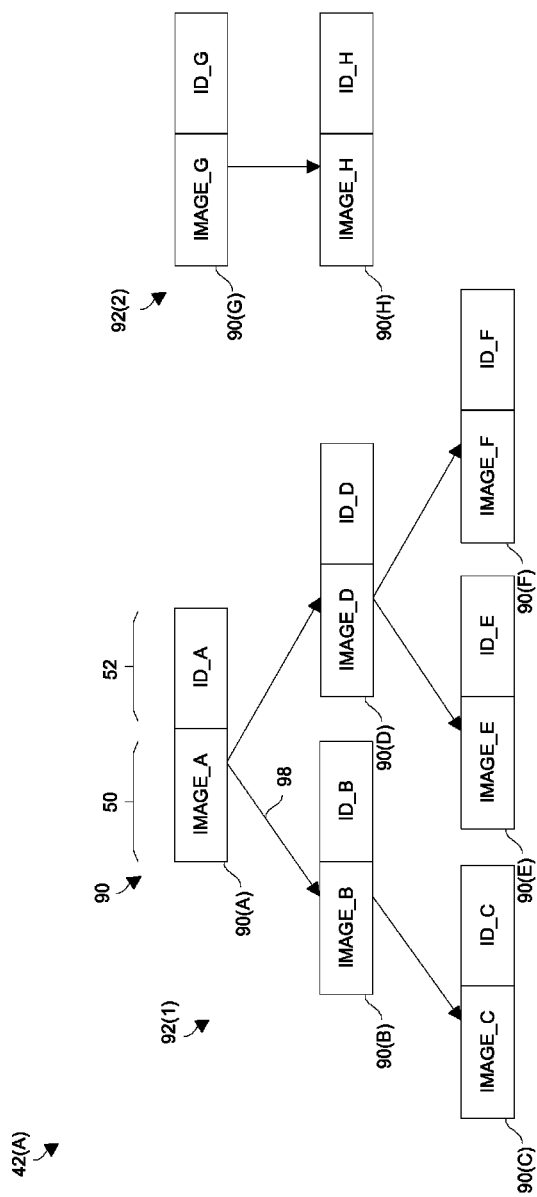
FIG. 3 is a block diagram of example contents of storage of a first computing device of the electronic environment of FIG. 1.

FIG. 3 shows a logical representation of some example contents of the storage repository 42(A) of the computing device 22(A) (also see FIGS. 1 and 2). As each disk image 50 is added to the storage repository 42(A), the disk image manager 40(A) adds and/or updates the associated metadata 52(A) to include a globally unique disk image identifier 54 which identifies that disk image 50, and the resulting combination of the disk image 50 and the associated metadata 52 forms an entry 90. For example, in connection with entry 90(A), disk image identifier ID_A identifies disk image IMAGE_A.

Over time, additional disk images 50 may be added to the storage repository 42(A). For example, disk image IMAGE_A may be modified to form disk image IMAGE_B which is then saved within the storage repository 42(A). In this situation, the disk image manager 40(A) creates another globally unique disk image identifier ID_B to identify disk image IMAGE_B, e.g., see entry 90(B). Here, disk image IMAGE_B is considered a child of disk image IMAGE_A, and disk image IMAGE_A is considered a parent of disk image IMAGE_B. This relationship is illustrated by an arrow 98. This process may continue to form a hierarchical arrangement 92(1) of disk image entries 90 having the shape of an inverted tree.

It should be understood that it is not necessary for the storage repository 42(A) to save each disk image 50 as a full disk image. Rather, for an arrangement of related disk images, a standard process of de-duplication can be applied so that the storage repository 42(A) stores a baseline disk image (e.g., disk image IMAGE_A), and then stores disk image differences to form other disk images 50 of the same arrangement 92(1).

It should be further understood that the storage repository 42(A) is capable of storing disk images 50 which are unrelated to each other. For example, FIG. 3 further shows another arrangement 92(2) formed by entries 90(G) and 90(H). In this arrangement 92(2), disk image IMAGE_H is a child of disk IMAGE_G, and disk image IMAGE_G is a parent of disk image IMAGE_H. However, no relationship exists between disk images IMAGE_G, IMAGE_H and any of the disk images 50 of arrangement 92(1) since there is no arrow extending between the arrangements 92(1), 92(2).

One will appreciate that FIG. 3 provides a logical view of the contents of the storage repository 42(A), and that the actual information may be stored within the storage repository 42(A) in a variety of ways. For example, the disk images 50 may reside in disk image database, while the metadata 52 (including the disk image identifiers 54) resides in a separate metadata database. As another example, disk images 50 may reside in a single database, and so on. As yet another example, the various data constructs may be distributed as files across a file system or as blocks over disks, and reference each other via pathnames or pointers, etc. Such structured storage of disk image information enables various tools to conveniently navigate among related disk images (e.g., tree-walk across an arrangement 92 of disk image entries 90 based on their parent/child relationships). Further details will now be provided with reference to FIG. 4.

Figure 4:
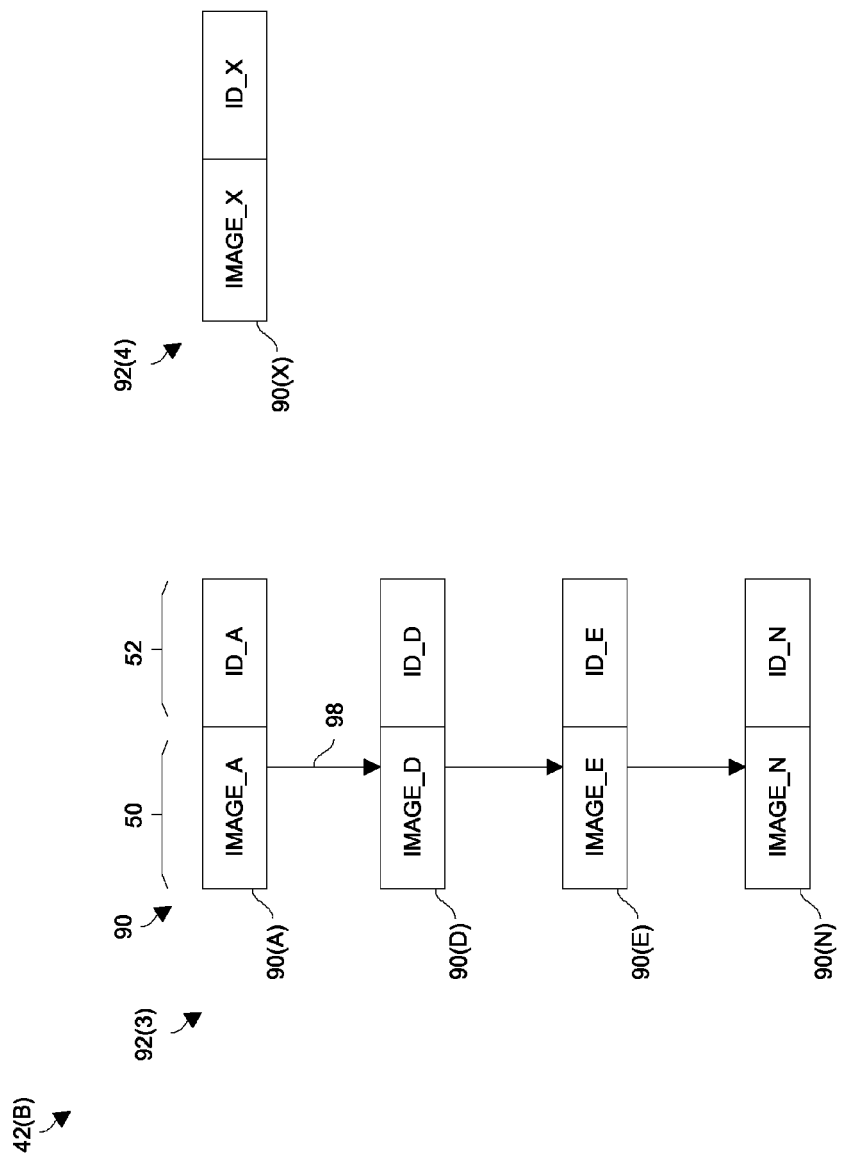
FIG. 4 is a block diagram of example contents of storage of a second computing device of the electronic environment of FIG. 1.

FIG. 4 shows a logical representation of some example contents of the storage repository 42(B) of the computing device 22(B) (also see FIGS. 1 and 2). The entries 90 form two arrangements 92(3), 92(4) which are unrelated to each other.

As shown in FIG. 4, the storage repository 42(B) has some disk images 50 which are in common with the storage repository 42(A) (FIG. 3). Namely, disk images IMAGE_A, IMAGE_D and IMAGE_E reside on both the storage repository 42(A) and the storage repository 42(B).

However, there are also disk images 50 which are not in common between the storage repositories 42(A), 42(B). For example, disk image IMAGE_N and disk image IMAGE_X reside the storage repository 42(B) (see entries 90(N) and 90(X) in FIG. 4). However, disk image IMAGE_N and disk image IMAGE_X do not reside on the storage repository 42(A) which is shown in FIG. 3.

At this point, it should be understood that the disk image managers 40 of the computing devices 22 are able to exchange information with each other to identify disk images 50 which are common to both computing devices 22. Once the common disk images 50 have been identified, the differences (changed portions) between a common disk image 50 and a particular disk image 50 to be deployed are transferred in order to provision a target computing device 22 with a full copy of the particular disk image 50. Further details will now be provided with reference to FIG. 5.

Figure 5:
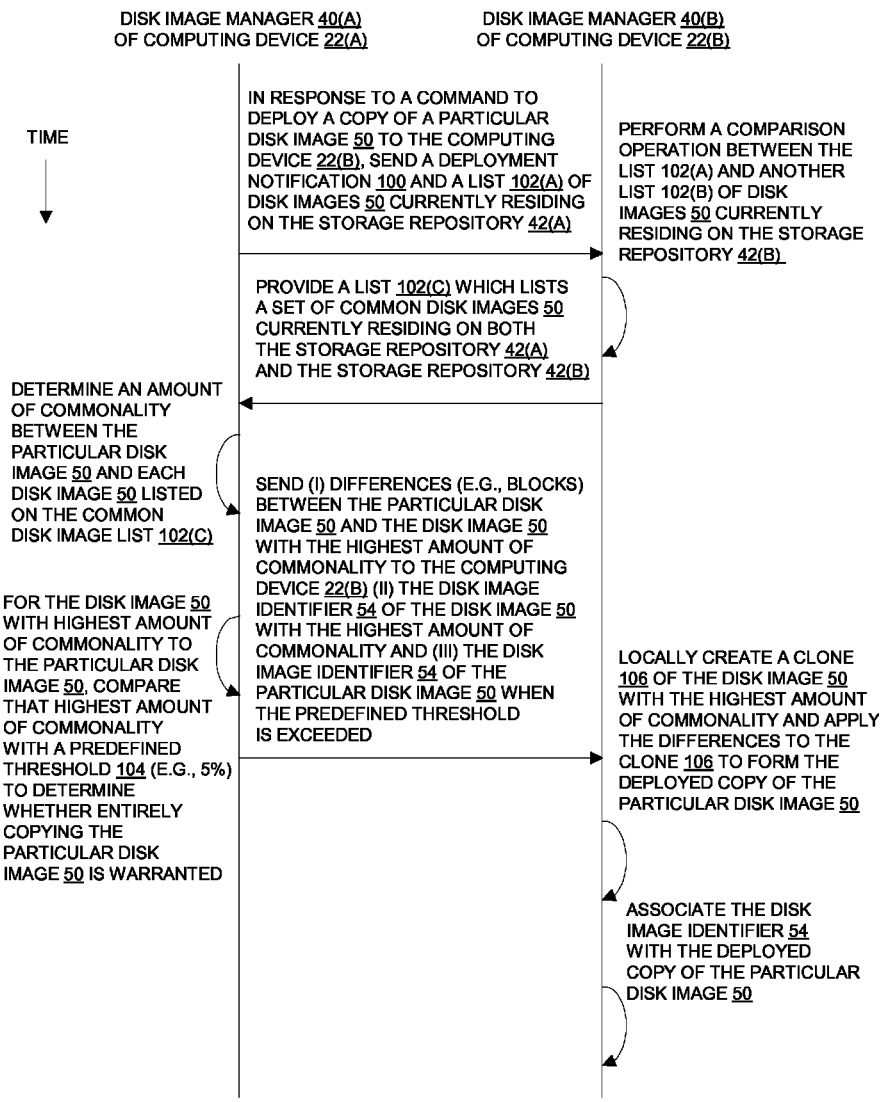
FIG. 5 is a sequence diagram illustrating a process of deploying a copy of a disk image from the first computing device to the second computing device of the electronic environment of FIG. 1.

FIG. 5 shows a sequence diagram illustrating particular details involved when deploying a copy of a particular disk image 50 from the computing device 22(A) to the computing device 22(B). By way of example, reference is made to the example contents of the computing devices 22(A), 22(B) shown in FIGS. 3 and 4. Time increases in the downward direction in FIG. 5.

Initially, the computing device 22(A) receives a command to deploy a copy of the particular disk image 50 from the computing device 22(A) to the computing device 22(B). In connection with the example contents of FIGS. 3 and 4, suppose that the command directs the computing device 22(A) to deploy a copy of the disk image IMAGE_F to the computing device 22(B) (also see FIG. 3). Such a command may be provided by a user of either computing device 22(A), 22(B) or a user operating one of the other electronic devices 26 (also see FIG. 1).

In response to the command, the disk image manager 40(A) of the computing device 22(A) sends a deployment notification 100 and a list 102(A) of disk images 50 currently residing on the storage repository 42(A) to the computing device 22(B). The deployment notification 100 activates the disk image manager 40(B) of the computing device 22(B). In connection with the example contents of FIGS. 3 and 4, the disk image manager 40(A) includes the disk image identifiers ID_A, ID_B, ID_C, ID_D, ID_E and ID_F in the list 102(A)

since the disk images 50 associated with these disk image identifiers 54 reside in the repository 42(A).

Next, the disk image manager 40(B) of the computing device 22(B) responds to receipt of the deployment notification 100 and the list 102(A) from the computing device 22(A) by performing a comparison operation between the list 102(A) and another list 102(B) of disk images 50 currently residing on the storage repository 42(B) of the computing device 22(B). In connection with the example contents of FIGS. 3 and 4, the list 102(B) includes the disk image identifiers ID_A, ID_D, ID_E, ID_N and ID_X. In some arrangements, the disk image manager 40(B) generates the list 102(B) in response to the deployment notification 100. In other arrangements, the disk image manager 40(B) maintains the list 102(B) in updated form even prior to receipt of the deployment notification 100.

The disk image manager 40(B) generates, as a result of the comparison operation, a common disk image list 102(C) of disk images 50 which currently reside on both the computing device 22(A) and the computing device 22(B), and sends that list 102(C) to the computing device 22(A). In connection with the example contents of FIGS. 3 and 4, the list 102(C) includes disk image identifiers ID_A, ID_D and ID_E.

Next, the disk image manager 40(A) determines amounts (or levels) of commonality between the particular disk image 50 and each disk image 50 identified by the common disk image list 102(C). It should be understood that the disk image manager 40(A) is able to call into the local storage subsystem (e.g., see the storage repository 42(A) in FIG. 1) to determine the amounts of commonality. In some arrangements, the amounts of commonality are measured by the number of differing portions (e.g., blocks) between the particular disk image 50 and the disk images 50 identified by the common disk image list 102(C). Other measurement techniques are suitable for use as well. In connection with the example contents of FIGS. 3 and 4, the disk image manager 40(A) evaluates the amount of commonality between disk image IMAGE_F (the disk image to be deployed) and disk images IMAGE_A, IMAGE_D and IMAGE_E which are identified by the common disk image list 102(C).

With reference to FIG. 3, it should be understood that disk image IMAGE_D which is a parent of disk image IMAGE_F may have a high level of commonality with disk image IMAGE_F. Also, disk image IMAGE_E which is a sibling of disk image IMAGE_F (i.e., another child of disk image IMAGE_D) may have a high level of commonality with disk image IMAGE_F.

Ultimately, the disk image manager 40(A) selects the disk image 50 with the highest level of commonality to the particular disk image 50. In connection with the example contents of FIGS. 3 and 4, suppose that disk image IMAGE_D has the highest level of commonality to the disk image IMAGE_F so that disk image IMAGE_D is selected.

At this point, the disk image manager 40(A) compares the amount of commonality for the selected disk image 50 (i.e., disk image IMAGE_D) to a predefined threshold 104 to determine whether the amount of commonality is insignificant thus warranting copying the particular disk image in its entirety from the computing device 22(A) to the computing device 22(B). Along these lines, one will appreciate that there is a certain amount of overhead required to extract and send only the differences from a disk image 50 to the other computing device 22(B) and there may exist a situation in which it is beneficial to completely copy a disk image 50. In some arrangements, the predefined threshold 104 is a static preset parameter such as 5%, 10%, and so on. In other arrangements, the predefined threshold 104 is tunable and can be changed by the user at any time.

When the amount of commonality is exceeds (or is greater than or equal to) the predefined threshold 104, the disk image manager 40(A) sends (i) the differences between the particular disk image 50 and the selected common disk image 50, (ii) the disk image identifier 54 which identifies the selected common disk image 50 (i.e., the disk image with the highest level of commonality), and (iii) the disk image identifier 54 which uniquely identifies the particular disk image 50. Otherwise, the disk manager 40(A) sends the particular disk image 50 in its entirety to the disk manager 40(B). In connection with the example contents of FIGS. 3 and 4 and supposing that the amount of commonality exceeds the predefined threshold 104, the disk image manager 40(A) sends (i) the differences between disk image IMAGE_F and the disk image IMAGE_D, (ii) the disk image identifier ID_D which identifies the disk image IMAGE_D, and (iii) the disk image identifier ID_F which uniquely identifies disk IMAGE_F.

Upon receipt, the disk image manager 40(B) locally creates a clone 106 (e.g., a copy of a disk image) of the selected common disk image 50 in the storage repository 42(B), and applies the differences to the clone 106 to form the deployed copy of the particular disk image 50. The disk image manager 40(B) then associates the disk image identifier 54 which identifies the particular disk image 50 with the deployed copy of the particular disk image 50. In connection with the example contents of FIGS. 3 and 4, the disk image manager 40(B) locally creates a clone 106 of disk image IMAGE_D based on the disk image identifier ID_D provided by the computing device 22(A), and applies the differences to the clone 106 to form disk image IMAGE_F. Additionally, the disk image manager 40(B) associates the disk image identifier ID_F with disk image IMAGE_F. Accordingly, the disk image managers 40(A), 40(B) have cooperatively operated to deploy a copy of a disk image 50 from the computing devices 22(A), 22(B) by conveying differences rather than a complete copy of the disk image 50.

It should be understood that there are a variety of techniques for determining a degree of commonality between disk images 50 and for identifying the disk image 50 with the highest degree of commonality. In some arrangements, when the source computing device 22 receives the list 102(C) of common disk images 50 from the target computing device 22, the disk image manager 40 of the source computing device 22 (e.g., see the disk image manager 40(A) of computing device 22(A) in FIG. 5) exhaustively compares each disk image 50 on the list 102(C) to the disk image 50 to be copied. In one embodiment, the disk image manager 40 tree-walks over the disk image arrangement 92 which includes the listed disk images 50 and counts the number of paths between each listed disk image 50 and the disk image 50 to be copied (also see FIG. 3); the listed disk image 50 with the least number of paths (or hops) to the disk image 50 to be copied being considered the disk image 50 with the highest degree of commonality. In another embodiment, the disk image manager 40 counts the number of different blocks between each listed disk image 50 and the disk image to be copied (e.g., computes a union of block allocation tables along the path in the tree 92(1) between the two disk images, with the size of the union reflecting the amount of difference between the disk images 50); the listed disk image 50 with the lowest number of different blocks being the disk image 50 with the highest degree of commonality. In yet another embodiment, for each listed disk image 50, the disk image manager 40 computes the ratio of the number of blocks in common to the number of blocks in the disk image 50 to be copied (i.e., a commonality ratio); the listed disk image 50 with the highest commonality ratio being considered the disk image 50 with the highest degree of commonality.

In other arrangements, the disk image manager 40 attempts to consider only a subset of the disk images 50 on the list 102(C) of common disk images 50 when the number disk images on the list 102(C) exceeds a predefined threshold (e.g., 25 disk images, 50 disk images, etc.). Such arrangements are capable of imposing limitations on the amount of processing performed by the source computing device 22 (e.g., see the disk image manager 40(A) of computing device 22(A) in FIG. 5). In one embodiment, based on parent/child relationships (see the tree arrangement 92(1) in FIG. 3), the disk image manager 40 of the source computing device 22 evaluates only the listed disk images 50 which are within a first predefined tree-walking distance from the disk image 50 to be copied (e.g., within 5 hops/paths). If the disk image manager 40 identifies at least one listed disk image 50 having a degree of commonality which exceeds the predefined threshold, the disk image manager 40 selects the listed disk image 50 having the highest degree of commonality (e.g., compares the number of different blocks between each listed disk image 50 and the disk image to be copied, compares commonality ratios, etc.). However, if there are no listed disk images 50 having a degree of commonality which exceeds the predefined threshold, the disk image manager 40 expands the evaluation to a second predefined tree-walking distance from the disk image 50 to be copied (e.g., between 5 and 10 hops/paths, etc.), and so on. Such operation may alleviate the need for the disk image manager 40 to compute block comparisons for each disk image 50 on the list 102(C). Moreover, during such tree-walking, certain customizations can be implemented such as selecting, as the disk image 50 with the highest degree of commonality, a child disk image 50 over a sibling disk image 50 thus providing a means of imposing particular optimizations or preferences in the selection process. Further details will now be provided with reference to FIG. 6.

Figure 6:
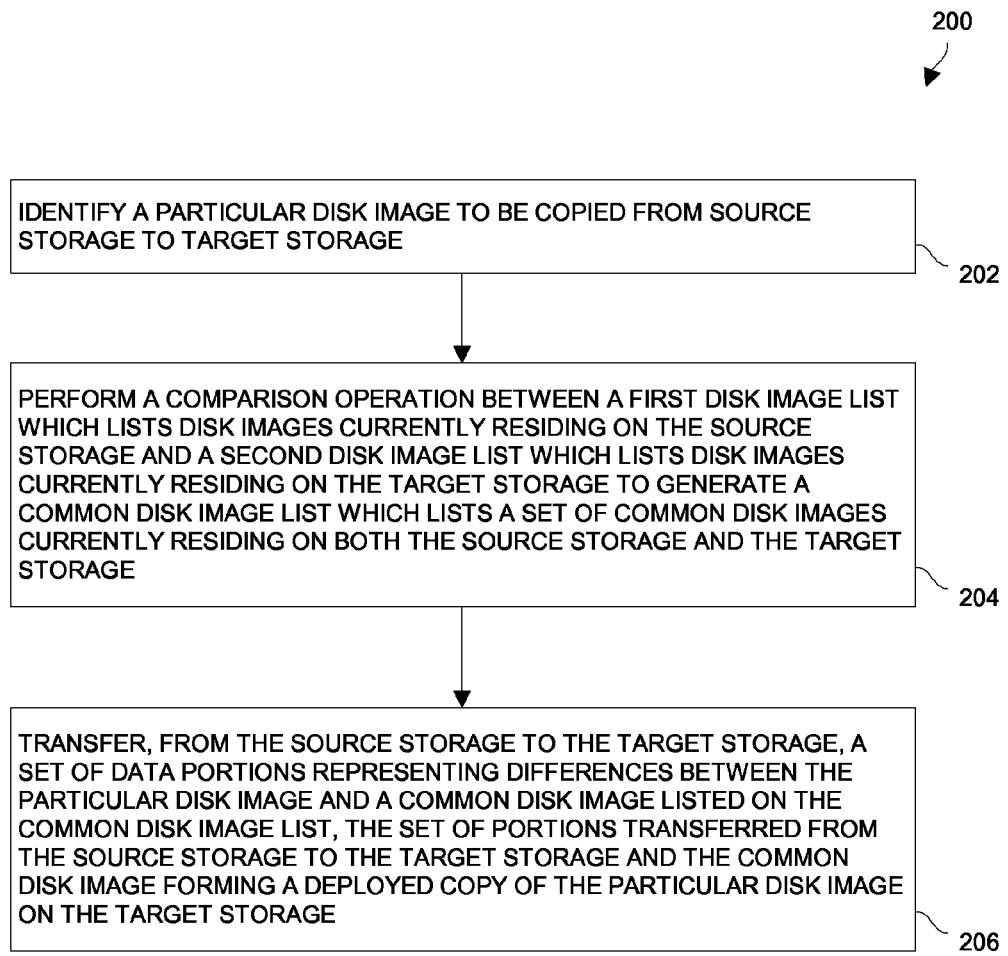
FIG. 6 is a flowchart which is performed by control circuitry of the electronic environment of FIG. 1.

FIG. 6 is a flowchart of a procedure 200 which is performed by control circuitry 64 of the electronic environment 20 (also see FIGS. 1 and 2). In some arrangements, the control circuitry 64 resides in a single computing device 22. In other arrangements, the control circuitry 64 is the combination of circuits in multiple computing devices 22 working in a collaborative manner. In yet other arrangements, the control circuitry 64 is formed, at least in part, by a circuit which is external to the computing devices 22 (e.g., see the other electronic devices 30 in FIG. 1).

Step 202 involves deploying a copy of a particular disk image 50 from source storage (e.g., the storage repository 42(A) to target storage (e.g., the storage repository 42(B)). In particular, the computing devices 22 of the electronic environment 20 are constructed and arranged to uniquely identify disk images 50 using disk image identifiers 54.

Step 204 involves performing a comparison operation between a first disk image list (e.g., see list 102(A) in FIG. 5) which lists disk images 50 currently residing on the source storage and a second disk image list (e.g., see list 102(B) in FIG. 5) which lists disk images 50 currently residing on the target storage to generate a common disk image list (e.g., see list 102(C) in FIG. 5) which lists a set of common disk images 50 currently residing on both the source storage and the target storage.

Step 206 involves transferring, from the source storage to the target storage, a set of data portions 44 representing differences between the particular disk image 50 and a common disk image 50 listed on the common disk image list. The common disk image 50 is the disk image 50 on the source storage with the highest level of commonality with the particular disk image to be deployed to the target storage, and that common disk image 50 is identified to the target storage by providing the disk image identifier of the common disk image 50.

When this transfer takes place, the set of data portions 44, the disk image identifier 54 which identifies the common disk image 50, and the disk image identifier 54 which identifies the particular disk image 50 are conveyed to the target storage. The set of data portions 44 transferred from the source storage to the target storage in combination with the common disk image 50 (identified to the target storage by disk image identifier 54) form a deployed copy of the particular disk image 50 on the target storage.

In some arrangements, step 206 is contingent on a successful evaluation of the level of commonality against a predefined threshold 104. Only when the level of commonality is greater than (or equal to) the predefined threshold 104 does the control circuitry 64 fully perform step 206. Otherwise, the complete disk image is copied between the computing devices 22.

Once the copy of the particular disk image 50 is formed on the target storage, the target storage associates the disk image identifier for the particular disk image 50 with the particular disk image 50. At this point, the copy of the particular disk image 50 is properly deployed on the target storage and is identifiable on the target storage via disk image identifier 54.

As explained above, an improved technique involves deploying a copy of a particular disk image 50 from one computing device 22 to another by identifying disk images 50 which are common among the two devices 22, and then transferring only differences 44 between the particular disk image 50 and a common disk image 50 to the other computing device 22. The common disk image 50 and the differences 44 form an entire copy of the particular disk image 50. To identify disk images 50 which are common among the two devices 22, the disk images 50 are tracked using disk image identifiers 54 which uniquely identify disk images 50. This technique of identifying disk images 50 which are in common, and moving only the differences 44 saves time and resources.

While various embodiments of the invention have been particularly shown and described, it will be understood by those skilled in the art that various changes in form and details may be made therein without departing from the spirit and scope of the invention as defined by the appended claims.

For example, the computing devices 22 where described above in general terms. In some arrangements, the computing devices 22 are virtualization platforms that are able to use the virtual disk images 50 to instantiate one or more virtual machines. However, in other arrangements, the computing devices are not virtualization platforms but are augmented storage servers which robustly and reliably store the disk images 50 (e.g., snapshots disks, golden images, etc.) for use by virtualization platforms.

Additionally, it should be understood that distribution of the disk image identifiers 54 was described above as being carried out in an automated manner by the disk image managers 40 by way of example only. In some arrangements, this distribution technique is very appropriate. For example, a user may wish to deploy copies of a golden image to several virtualization platforms or VM farms.

However, in some situations, the user may know that a particular disk image 50 on multiple computing devices 22 is the same disk image 50, but this fact may not be evident to the computing devices 22. Accordingly, in some arrangements, the user is able to manually set (or overwrite) the disk image identifiers 54 in order to enable multiple computing devices 22 to reference the same disk image 50 using one disk image identifier 50.

Furthermore, it should be understood that the command to deploy a copy of a particular disk image 50 from one computing device 22 to another computing device 22 may be implemented as a standard procedure call through an application programming interface (API). In such arrangements, a user or application (e.g., a control program) is capable of issuing a call for a single copy deployment, or multiple calls (or a single call to a multiple-copy routine) for wider deployment.

Moreover, it should be understood that a user or application can carry out batch copy deployment in which multiple related disk images are copied from one computing device 22 to another. In some arrangements, in response to a single call (e.g., "copy_multiple_images"), the control circuitry 64 orders the copy operations so that the first disk image 50 copied has the highest level of commonality with other images that are part of the batch copy. Then, other disk images 50 are copied as differences against the first disk image 50 thus optimizing the total transfer of differences between the computing devices 22.

What is claimed is:

1. In a computing device, a method of deploying a copy of a disk image from source storage to target storage, the method comprising:
    identifying a particular disk image to be copied from the source storage to the target storage;
    performing a comparison operation between a first disk image list which lists disk images currently residing on the source storage and a second disk image list which lists disk images currently residing on the target storage to generate a common disk image list which lists a set of common disk images currently residing on both the source storage and the target storage; and
    transferring, from the source storage to the target storage, a set of data portions representing differences between the particular disk image and a common disk image listed on the common disk image list;
    (i) the set of data portions transferred from the source storage to the target storage and (ii) the common disk image listed on the common disk image list forming a deployed copy of the particular disk image on the target storage.

2. A method as in claim 1 wherein identifying the particular disk image to be copied from the source storage to the target storage includes:
    specifying a particular disk image identifier which uniquely identifies the particular disk image among the disk images currently residing on the source storage.

3. A method as in claim 2 wherein the first disk image list includes a first set of disk image identifiers identifying the disk images currently residing on the source storage;
    wherein the second disk image list includes a second set of disk image identifiers identifying the disk images currently residing on the target storage; and
    wherein performing the comparison operation includes (i) comparing the first set of disk image identifiers to the second set of disk image identifiers to generate a common set of disk image identifiers, each disk image identifier of the common set belonging to both the first set of disk image identifiers and the second set of disk image identifiers, and (ii) outputting the common set of disk image identifiers as at least part of the common disk image list.

4. A method as in claim 3 wherein each disk image identifier of the common set of disk image identifiers identifies a virtual disk image having a respective amount of commonality with the particular disk image; and
    wherein the method further comprises (i) evaluating, for each virtual disk image identified by the common set of disk image identifiers, the respective amount of commonality of that virtual disk image with the particular disk image, and (ii) selecting, from virtual disk images identified by the common set of disk image identifiers, the virtual disk image with the highest amount of commonality with the particular disk image as the common disk image.

5. A method as in claim 4 wherein transferring the set of data portions includes:
    conveying, from the source storage to the target storage, blocks of the particular disk image which are not in common with the common disk image.

6. A method as in claim 3 wherein each disk image identifier of the common set of disk image identifiers identifies a disk image having a respective amount of commonality with the particular disk image; and
    wherein the method further comprises (i) evaluating, for each disk image identified by the common set of disk image identifiers, the respective amount of commonality of that disk image with the particular disk image, (ii) selecting, from disk images identified by the common set of disk image identifiers, the disk image with the highest amount of commonality with the particular disk image, and (iii) comparing the highest amount of commonality to a predefined threshold to determine whether the amount of commonality is insignificant to warrant entirely copying the particular disk image from the source storage to the target storage.

7. A method as in claim 6 wherein transferring the set of data portions includes:
    conveying, from the source storage to the target storage, blocks of the particular disk image which are not in common with the common disk image in response to a determination that the highest amount of commonality is greater than or equal to the predefined threshold; and
    wherein the method further comprises:
    after conveying the blocks of the particular disk image which are not in common with the common disk image from the source storage to the target storage, conveying, from the source storage to the target storage, blocks of another disk image which are not in common with the particular disk image to deploy a copy of the other disk image from the source storage to the target storage.

8. A method as in claim 2, further comprising:
    transferring, from the source storage to the target storage, the particular disk image identifier as metadata which is associated with the particular disk image.

9. A method as in claim 8 wherein transferring the particular disk image identifier as metadata which is associated with the particular disk image includes:
    receiving a disk image deployment command directing a copy of the particular disk image to be deployed from the source storage to the target storage, and
    automatically exporting the particular disk image identifier from the source storage to the target storage in response to the disk image deployment command.

10. A method as in claim 8 wherein transferring the particular disk image identifier as metadata which is associated with the particular disk image includes:

receiving a manually-provided user command which directs copying of the particular disk image identifier from the source storage to the target storage, and copying the particular disk image identifier from the source storage to the target storage in response to the manually-provided user command.

11. A method as in claim 8, further comprising:

after the particular disk image identifier has been transferred from the source storage to the target storage, (i) modifying the particular disk image on the source storage to form a new disk image, (ii) generating, as metadata which is associated with the new disk image, a new disk image identifier to uniquely identify the new disk image, and (iii) saving the new disk image identifier in a database of disk image identifiers on the source storage.

12. A method as in claim 8, further comprising:

after the particular disk image identifier has been transferred from the source storage to the target storage, (i) modifying the particular disk image on the target storage to form a new disk image, (ii) generating, as metadata which is associated with the new disk image, a new disk image identifier to uniquely identify the new disk image, and (iii) saving the new disk image identifier in a database of disk image identifiers on the target storage.

13. A computing system, comprising:

source storage;

target storage; and control circuitry coupled to the source storage and the target storage, the control circuitry being constructed and arranged to:

identify a particular disk image to be copied from the source storage to the target storage, perform a comparison operation between a first disk image list which lists disk images currently residing on the source storage and a second disk image list which lists disk images currently residing on the target storage to generate a common disk image list which lists a set of common disk images currently residing on both the source storage and the target storage, and transfer, from the source storage to the target storage, a set of data portions representing differences between the particular disk image and a common disk image listed on the common disk image list to form a deployed copy of the particular disk image on the target storage.

14. A computing system as in claim 13 wherein the control circuitry, when identifying the particular disk image to be copied from the source storage to the target storage, is constructed and arranged to:

specify a particular disk image identifier which uniquely identifies the particular disk image among the disk images currently residing on the source storage.

15. A computing system as in claim 14 wherein the first disk image list includes a first set of disk image identifiers identifying the disk images currently residing on the source storage;

wherein the second disk image list includes a second set of disk image identifiers identifying the disk images currently residing on the target storage; and wherein the control circuitry, when performing the comparison operation, is constructed and arranged to (i) compare the first set of disk image identifiers to the second set of disk image identifiers to generate a common set of disk image identifiers, each disk image identifier of the common set belonging to both the first set of disk image identifiers and the second set of disk image identifiers, and (ii) outputting the common set of disk image identifiers as at least part of the common disk image list.

16. A computing system as in claim 15 wherein each disk image identifier of the common set of disk image identifiers identifies a disk image having a respective amount of commonality with the particular disk image; and wherein the control circuitry is further constructed and arranged to (i) evaluate, for each disk image identified by the common set of disk image identifiers, the respective amount of commonality of that disk image with the particular disk image, and (ii) select, from disk images identified by the common set of disk image identifiers, the disk image with the highest amount of commonality with the particular disk image as the common disk image.

17. A computer program product which includes a non-transitory computer readable medium storing a set of instructions that, when performed by computer processing circuitry, cause the computer processing circuitry to carry out a method of deploying a copy of a disk image from source storage to target storage, the method comprising:

identifying a particular disk image to be copied from the source storage to the target storage;

performing a comparison operation between a first disk image list which lists disk images currently residing on the source storage and a second disk image list which lists disk images currently residing on the target storage to generate a common disk image list which lists a set of common disk images currently residing on both the source storage and the target storage; and transferring, from the source storage to the target storage, a set of data portions representing differences between the particular disk image and a common disk image listed on the common disk image list;

(i) the set of data portions transferred from the source storage to the target storage and (ii) the common disk image listed on the common disk image list forming a deployed copy of the particular disk image on the target storage.

18. A computer program product as in claim 17 wherein identifying the particular disk image to be copied from the source storage to the target storage includes:

specifying a particular disk image identifier which uniquely identifies the particular disk image among the disk images currently residing on the source storage.

19. A computer program product as in claim 18 wherein the first disk image list includes a first set of disk image identifiers identifying the disk images currently residing on the source storage;

wherein the second disk image list includes a second set of disk image identifiers identifying the disk images currently residing on the target storage; and wherein performing the comparison operation includes (i) comparing the first set of disk image identifiers to the second set of disk image identifiers to generate a common set of disk image identifiers, each disk image identifier of the common set belonging to both the first set of disk image identifiers and the second set of disk image identifiers, and (ii) outputting the common set of disk image identifiers as at least part of the common disk image list.

20. A computer program product as in claim 19 wherein each disk image identifier of the common set of disk image identifiers identifies a disk image having a respective amount of commonality with the particular disk image; and wherein the method further comprises (i) evaluating, for each disk image identified by the common set of disk image identifiers, the respective amount of commonality of that disk image with the particular disk image, and (ii) selecting, from disk images identified by the common set of disk image identifiers, the disk image with the highest amount of commonality with the particular disk image as the common disk image.

* * * * *